(12) United States Patent
Kitzmiller et al.

(10) Patent No.: US 10,647,100 B2
(45) Date of Patent: *May 12, 2020

(54) IN-LINE LAMINATION METHOD AND APPARATUS

(71) Applicant: Berry Plastics Corporation, Evansville, IN (US)

(72) Inventors: Brooke D. Kitzmiller, North Canton, OH (US); Jeffrey A. Middlesworth, Sheboygan, WI (US)

(73) Assignee: Berry Plastics Corporation, Evansville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,825

(22) Filed: Feb. 15, 2019

(65) Prior Publication Data

US 2019/0176451 A1 Jun. 13, 2019

Related U.S. Application Data

(63) Continuation of application No. 15/493,240, filed on Apr. 21, 2017, now Pat. No. 10,245,814.

(60) Provisional application No. 62/326,374, filed on Apr. 22, 2016.

(51) Int. Cl.
*B32B 37/00* (2006.01)
*B32B 37/12* (2006.01)
*B32B 5/02* (2006.01)
*B32B 38/00* (2006.01)
*B32B 37/20* (2006.01)

(52) U.S. Cl.
CPC .......... *B32B 37/0053* (2013.01); *B32B 5/022* (2013.01); *B32B 37/12* (2013.01); *B32B 37/1292* (2013.01); *B32B 37/203* (2013.01); *B32B 2305/20* (2013.01); *B32B 2307/51* (2013.01)

(58) Field of Classification Search
CPC ... B32B 37/0053; B32B 37/12; B32B 37/022; B32B 2307/51; Y10T 156/1087
See application file for complete search history.

(56) References Cited

U.S. PATENT DOCUMENTS

| | | | | |
|---|---|---|---|---|
| 6,092,761 | A * | 7/2000 | Mushaben | B65H 23/32 242/615.1 |
| 6,214,147 | B1 * | 4/2001 | Mortellite | A61F 13/15699 156/201 |
| 10,245,814 | B2 * | 4/2019 | Kitzmiller | B32B 5/022 |

* cited by examiner

*Primary Examiner* — Mark A Osele
*Assistant Examiner* — Christopher C Caillouet
(74) *Attorney, Agent, or Firm* — Barnes & Thornburg LLP

(57) ABSTRACT

A lamination system includes a film supply, a material supply, and a laminator. The laminator causes a film from the film supply to be laminated to a sheet from the material supply to establish a laminated sheet.

20 Claims, 11 Drawing Sheets

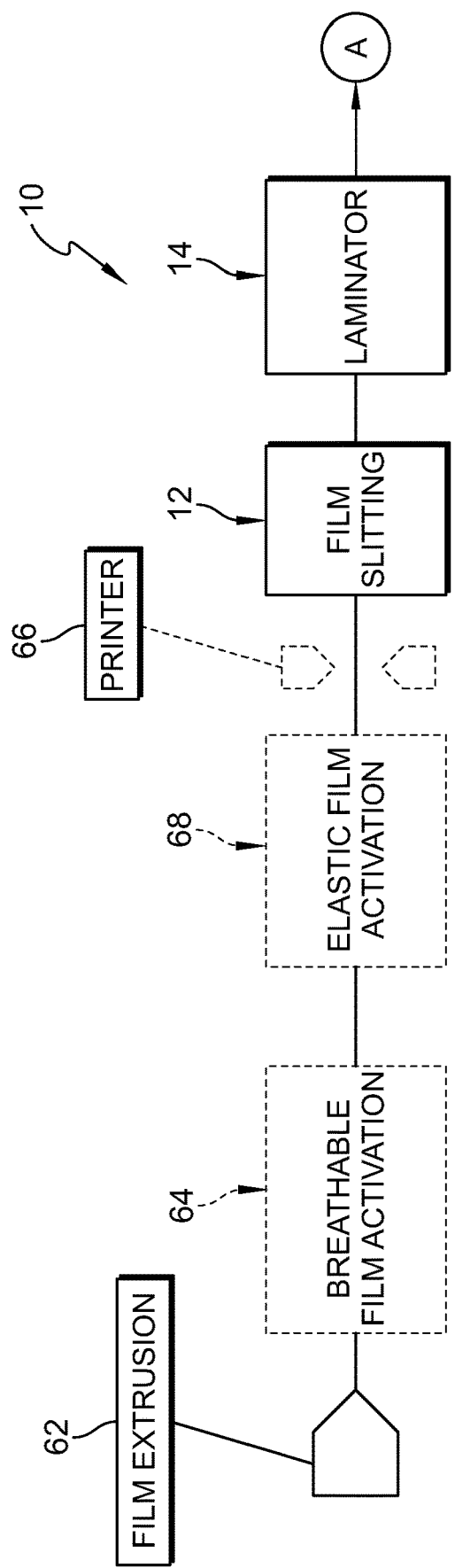
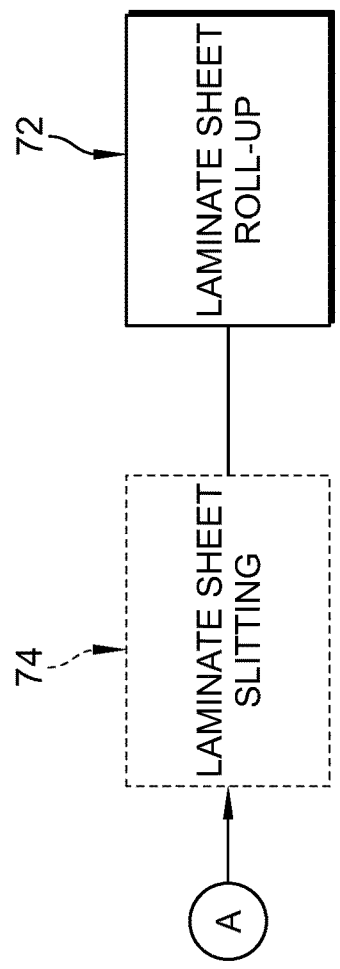
FIG. 12
FIG. 13

IN-LINE LAMINATION METHOD AND APPARATUS

PRIORITY CLAIM

This application is a continuation of U.S. patent application Ser. No. 15/493,240, filed Apr. 21, 2017, now U.S. Pat. No. 10,245,814, issued Apr. 2, 2019, which claims priority under 35 U.S.C. § 119(e) to U.S. Provisional Application No. 62/326,374, filed Apr. 22, 2016, each of which is expressly incorporated by reference herein.

BACKGROUND

The present disclosure relates to a lamination system, and particularly to a system for laminating a web to a film.

SUMMARY

According to the present disclosure, a lamination system includes a film supply, a material supply, and a laminator. The laminator causes a film from the film supply to be laminated to a web from the material supply to establish a laminated sheet.

In illustrative embodiments, the lamination system further includes a slitter. The slitter slits the film to establish strips of film which pass through the laminator for bonding with the web from the material supply. The material supply includes a first web and a second web.

In illustrative embodiments, the laminator includes a pair of lamination nip rollers and adhesive applicators. The adhesive applicators are configured to selectively apply adhesive to portions of the first and second webs. The first web passes through the lamination nip rollers along a first side of the film strips and the second web passes through the lamination nip rollers along a second side of the film strips opposite the first side. The first web is bonded to some of the film strips and the second web is bonded to the remaining film strips to form laminate sheets having alternating zones of film and material.

In illustrative embodiments, the laminator includes two lamination stations. Each lamination station includes adhesive applicators and lamination nip rollers. The first web and some of the film strips pass through a first lamination station to form a first laminate sheet. The second web and the other film strips pass through a second lamination station to form a second laminate sheet.

In illustrative embodiments, the laminator includes alignment nip rollers and an ultrasonic welder. Kiss coaters apply an anti-bond material to portions of the first and second webs. The ultrasonic welder bonds the film strips to the uncoated portions of the webs to form separate laminate sheets.

In illustrative embodiments, the laminator includes two lamination stations. Each lamination station includes alignment nip rollers and an ultrasonic welder. The first web and some of the film strips pass through a first lamination station to form a first laminate sheet. The second web and the other film strips pass through a second lamination station to form a second laminate sheet.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is an upper perspective view of an in-line lamination system in accordance with the present disclosure showing that a film is slit into strips and fed through a pair of lamination nip rollers to bond with non-woven webs feeding through the same pair of lamination nip rollers and suggesting that some of the strips of film adhere to an upper non-woven web while the other strips of film adhere to a lower non-woven web such that laminate sheets are formed having alternating zones of non-woven material and film along their widths as the laminate sheets are vertically separated from one another;

FIG. 2 is a side elevation view of the in-line lamination system of FIG. 1 showing that a single sheet of film is combined with two sheets of non-woven material to form two sheets of laminated material for use in subsequent processing;

FIG. 3 is a front elevation view of the in-line lamination system of FIG. 1 showing the diverging laminate sheets after leaving the lamination nip rollers and suggesting that a width of the upper non-woven web ($W_2$) is larger than a combined width of the incoming strips of film ($W_1$) which is larger than a width of the lower non-woven web ($W_3$) where an odd number of strips of film are used to form the laminate sheets;

FIG. 4 is a front elevation view of another embodiment of an in-line lamination system in accordance with the present disclosure showing diverging laminate sheets of film and non-woven material after leaving lamination nip rollers of the in-line lamination system and suggesting that a width of an upper non-woven web ($W_2$) is equal to a width of the incoming film ($W_1$) which is equal to a width of the lower non-woven web ($W_3$) where an even number of strips of film are used to form the laminate sheets;

FIG. 5 is an upper perspective view of another embodiment of an in-line lamination system in accordance with the present disclosure showing that the in-line lamination system includes two lamination stations and suggesting that a single film is slit into multiple strips with some strips passing through an upper lamination station to bond with a non-woven web and form a first laminate sheet and the other strips of film passing through a lower lamination station to bond with a non-woven web and form a second laminate sheet;

Figure 1:
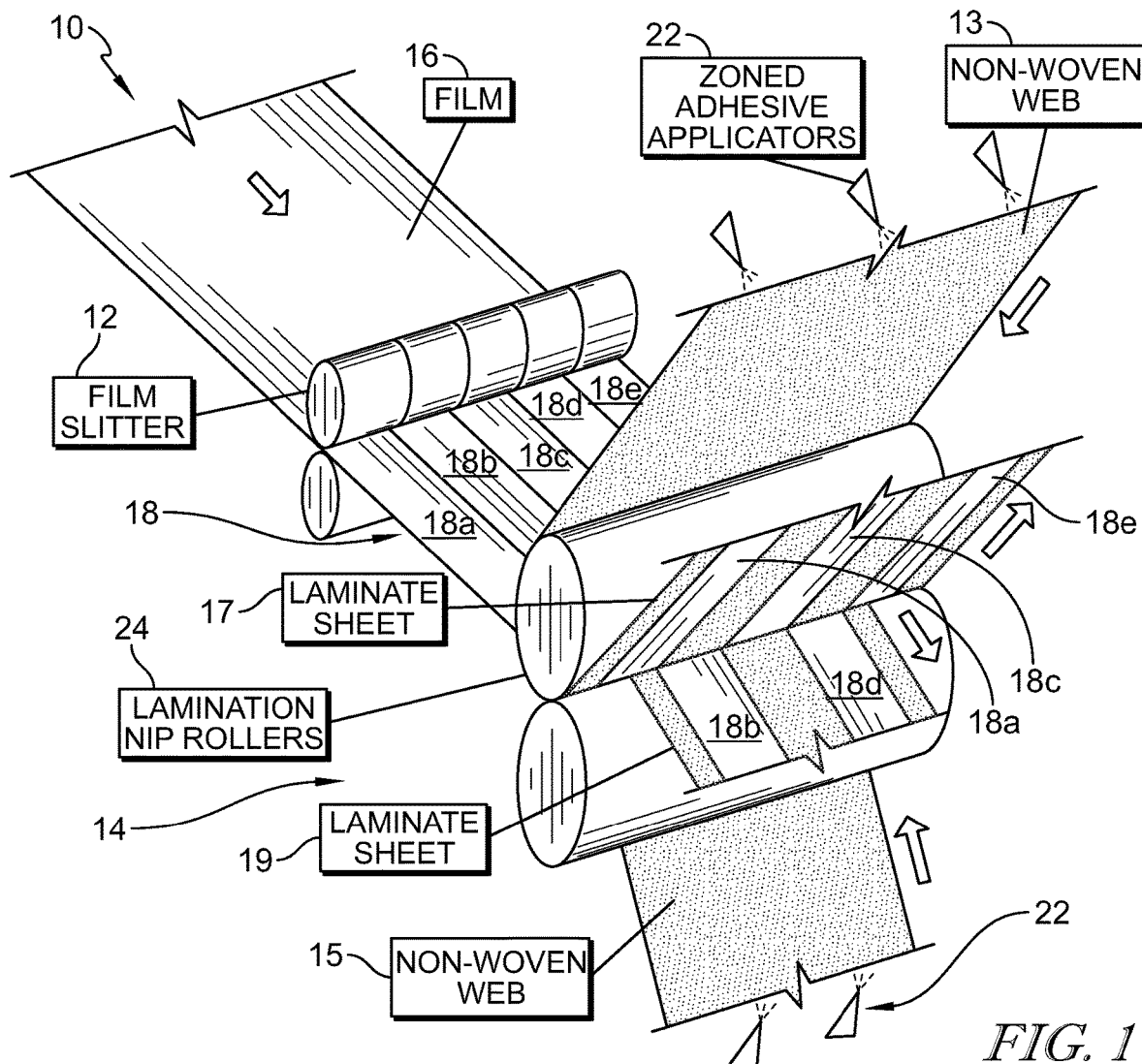
Figure 9:
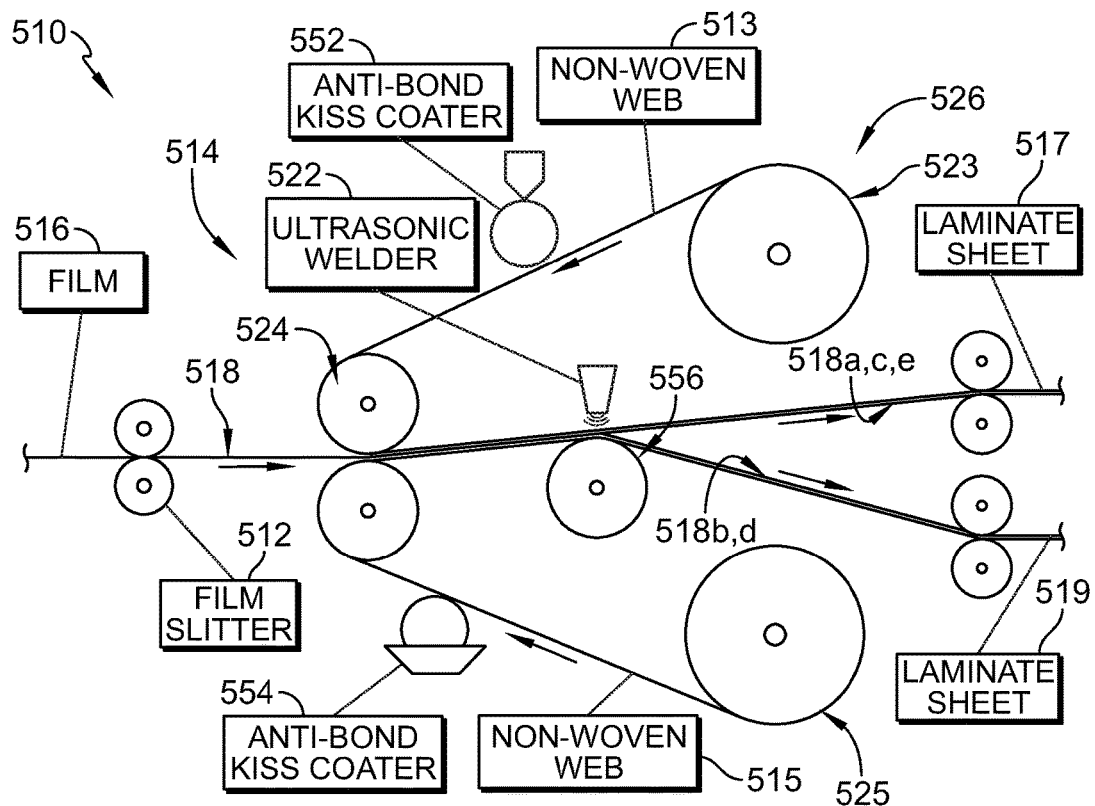
Figure 10:
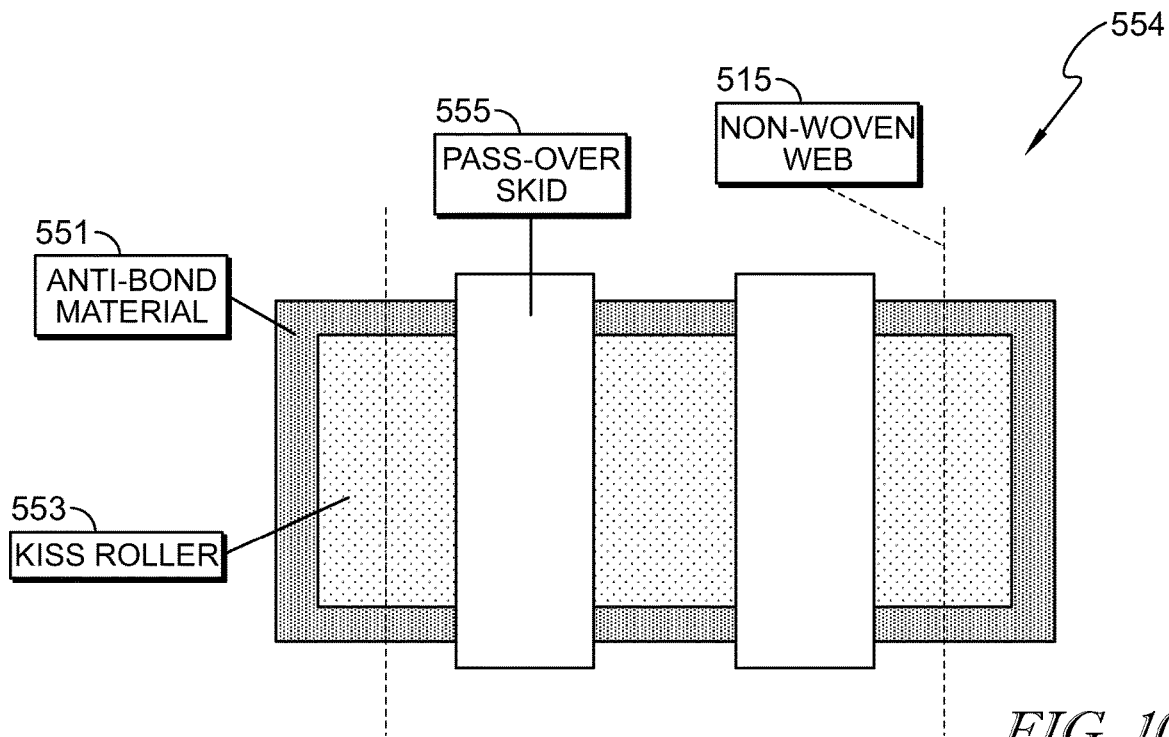
Figure 11:
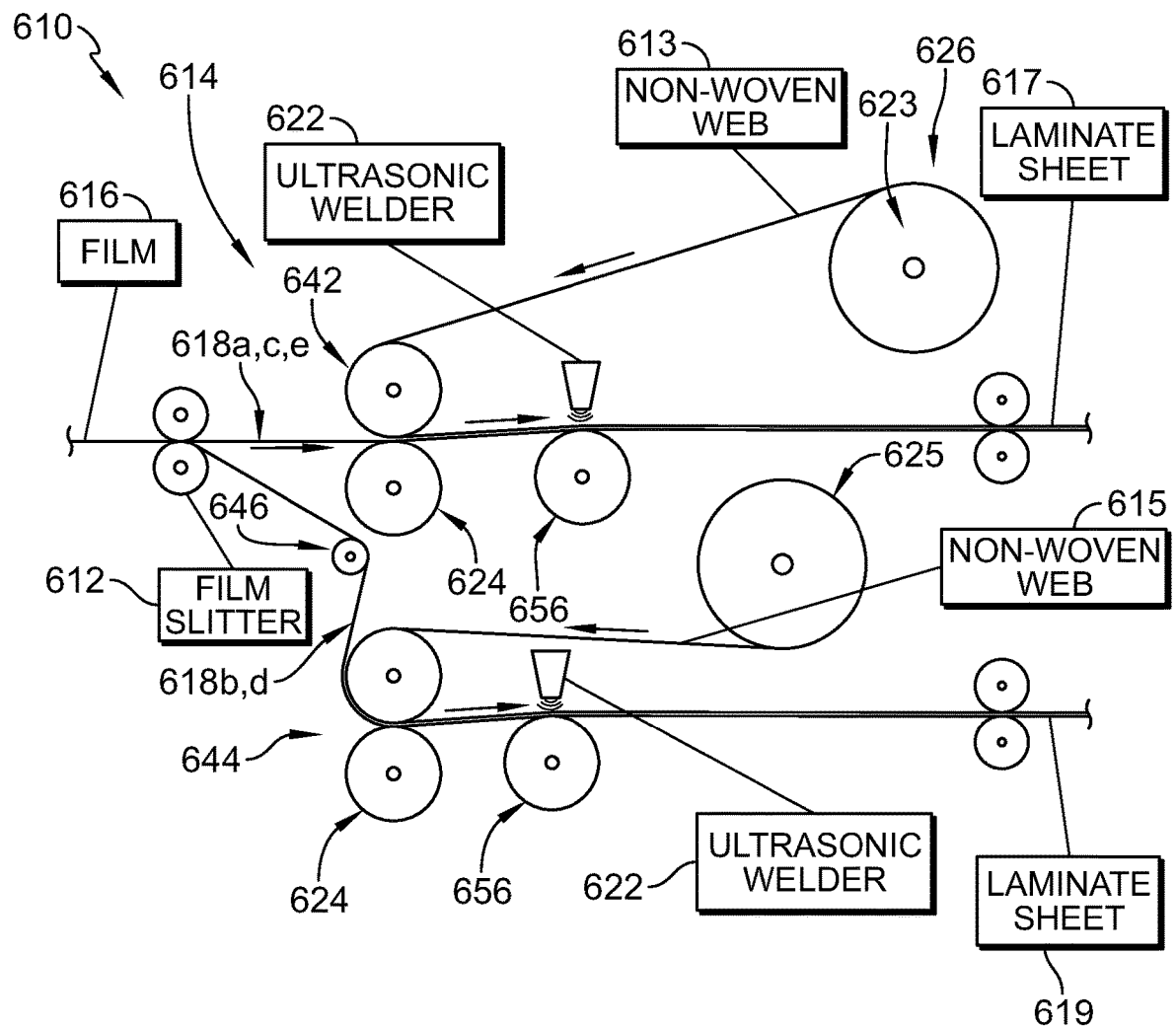
Figure 14:
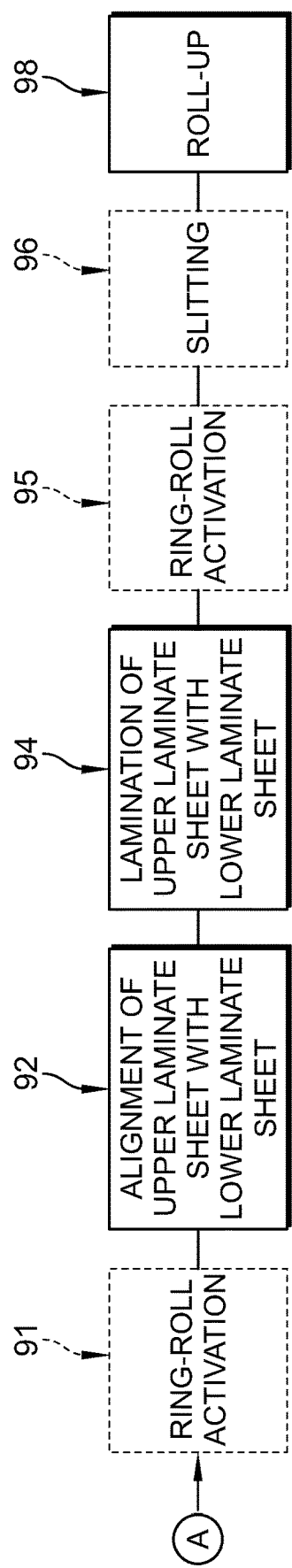
Figure 15:
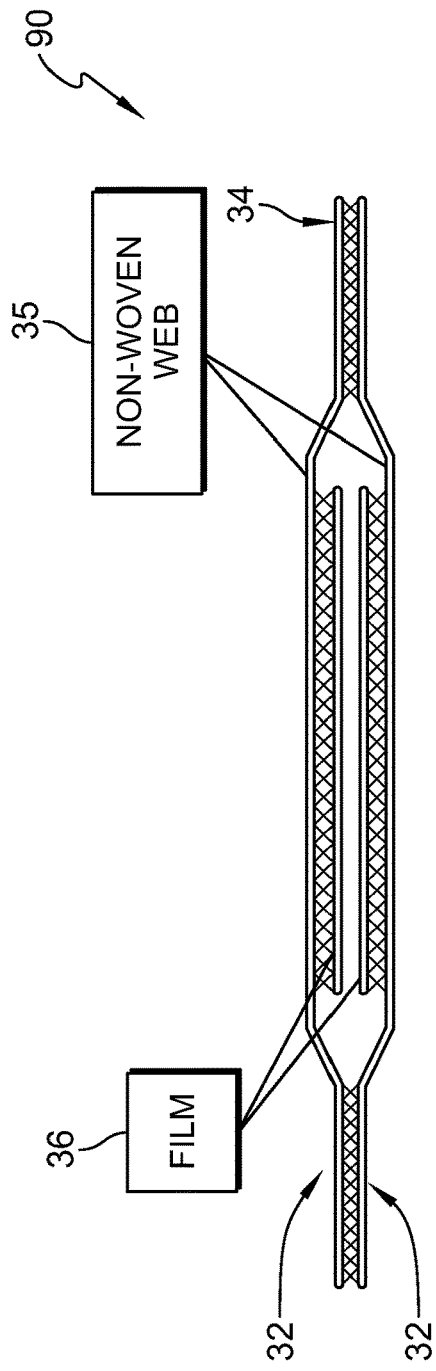
Figure 16:
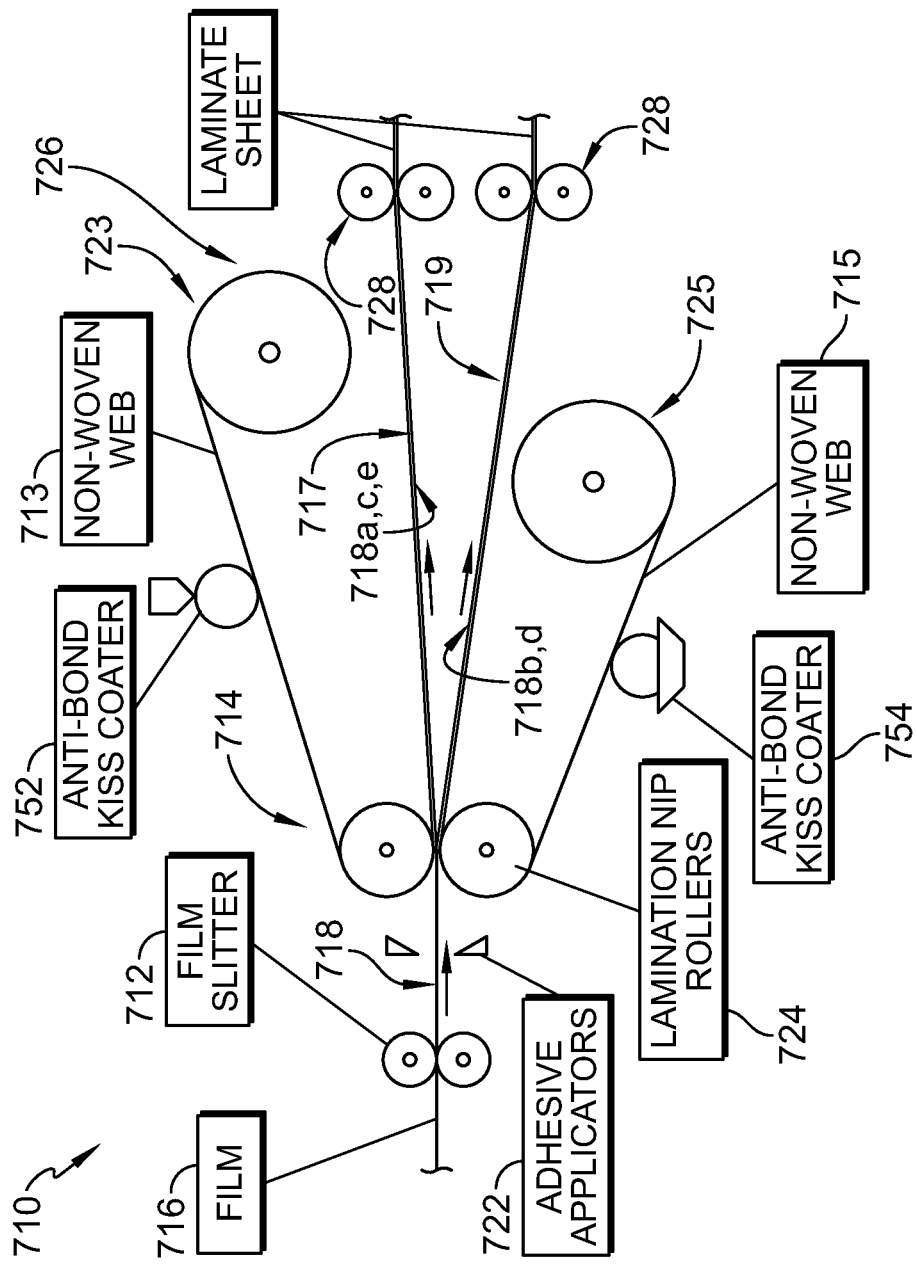
Figure 17:
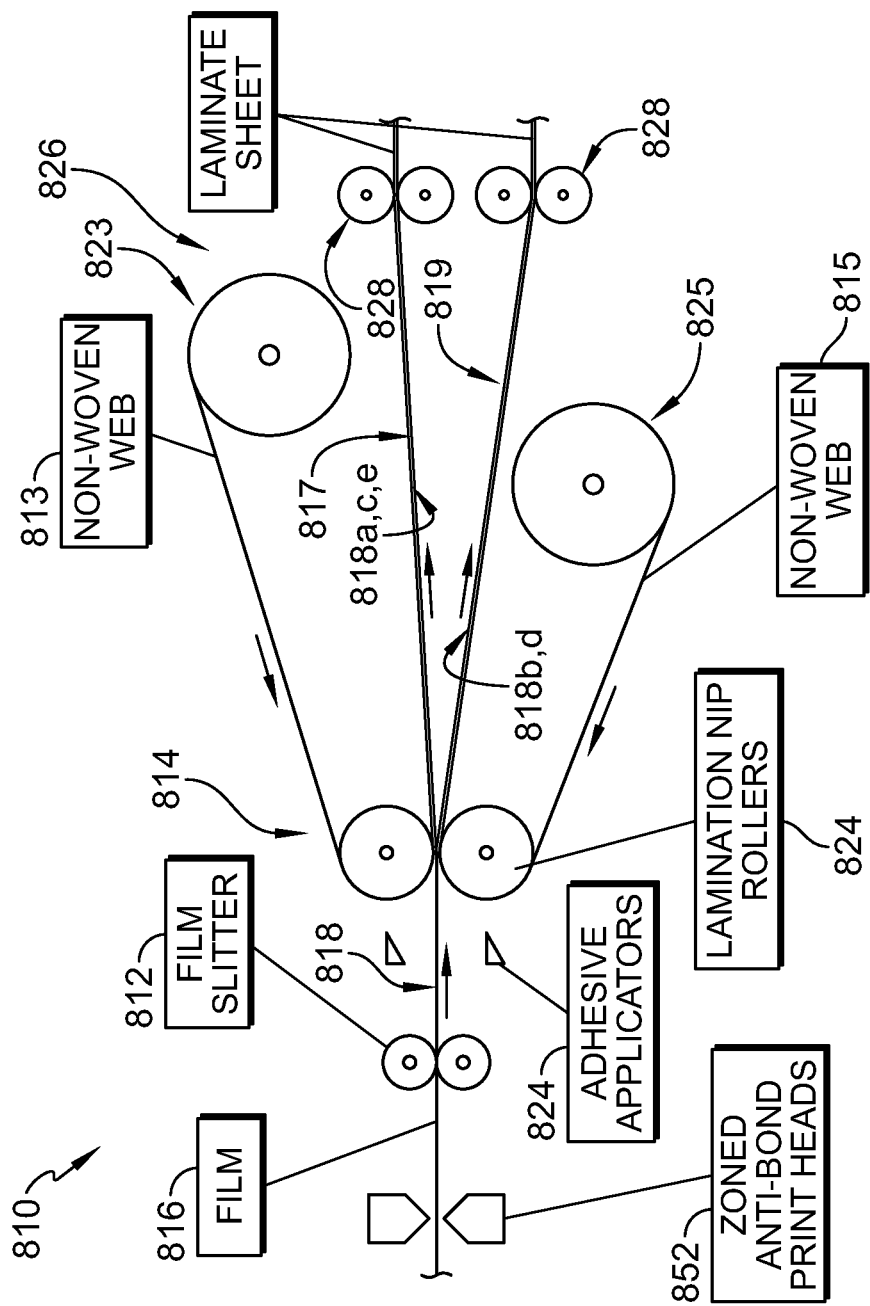

FIG. 9 is a side elevation view of another embodiment of an in-line lamination system in accordance with the present disclosure showing that the in-line lamination system includes a pair of alignment nip rollers configured to gather and align strips of film with upper and lower non-woven webs and an ultrasonic welder for bonding the strips of film with the non-woven webs to form separate laminate sheets and suggesting that kiss coaters apply an anti-bond material to the non-woven webs to allow zoned bonding of the non-woven webs with the film strips;

FIG. 10 is an upper plan view of the kiss coater of FIG. 9 showing that the kiss coater includes a kiss roller and one or more pass-over skids and suggesting that the kiss roller gathers anti-bond material for application on the non-woven web as the non-woven web passes over the kiss roller and that the skids block application of the anti-bond material to portions of the non-woven web;

FIG. 11 is a side elevation view of another embodiment of an in-line lamination system in accordance with the present disclosure showing that the in-line lamination system includes two pairs of alignment nip rollers configured to gather and align strips of film with upper and lower non-woven webs and ultrasonic welders for bonding the strips of film with the non-woven webs to form separate laminate sheets;

FIG. 12 is a diagrammatic view of the in-line lamination system of FIG. 1 showing that the in-line lamination system includes a film supply, an optional breathable film activation station, an optional elastic film activation station, an optional printer for printing on the film, a film slitter, and a laminator;

FIG. 13 is a view similar to FIG. 12 showing one embodiment of subsequent processing stations in the in-line lamination system including an optional laminate sheet slitter and laminate sheet roll-up station;

FIG. 14 is a view similar to FIG. 13 showing another embodiment of subsequent processing stations in the in-line lamination system including a laminate sheet alignment station, a sheet lamination station for forming multiple sections of laminate product, an optional laminate product slitter to separate adjacent sections of laminate product into strips, and a laminate product roll-up station;

FIG. 15 is a sectional view of one laminate product formed by the in-line lamination system of FIG. 14 showing that the laminate product includes two outer layers of non-woven material with two narrower inner layers of film;

FIG. 16 is a side elevation view of another embodiment of an in-line lamination system in accordance with the present disclosure showing that the in-line lamination system includes a pair of lamination nip rollers configured to bond strips of film with non-woven webs feeding through the same pair of lamination nip rollers and suggesting that kiss coaters apply an anti-bond material to the non-woven webs to allow zoned bonding of the non-woven webs with the film strips; and FIG. 17 is a side elevation view of another embodiment of an in-line lamination system in accordance with the present disclosure showing that the in-line lamination system includes a pair of lamination nip rollers to bond strips of film with non-woven webs feeding through the same pair of lamination nip rollers and suggesting that print heads apply an anti-bond material to the film to allow zoned bonding of the non-woven webs with the film strips.

DETAILED DESCRIPTION

An in-line lamination system 10 in accordance with the present disclosure is shown in FIG. 1. In-line lamination system 10 includes a film slitter 12 and a laminator 14. A film 16, such as a breathable or elastic plastic film, is delivered from a film supply, such as an extruder 62 shown in FIG. 12, and passes through slitter 12 to divide film 16 into strips 18. Strips 18 pass through laminator 14 to bond with non-woven webs 13, 15 to form separate laminate sheets 17, 19 (sometimes called a bi-laminate) having alternating sections of exposed non-woven material 34 and film 36 laminated to and covering a portion of the underlying non-woven material as suggested in FIGS. 3 and 4. Each laminate sheet 17, 19 is configured to be separated into multiple strips of laminate material having a central section of film 36 and sections of non-woven material 34 extending along side edges of film section 36. In some embodiments, film 16 is pre-processed before lamination as suggested in FIG. 12. In some embodiments, laminate sheets 17, 19 are post-processed after lamination as suggested in FIGS. 13-15.

Figure 2:
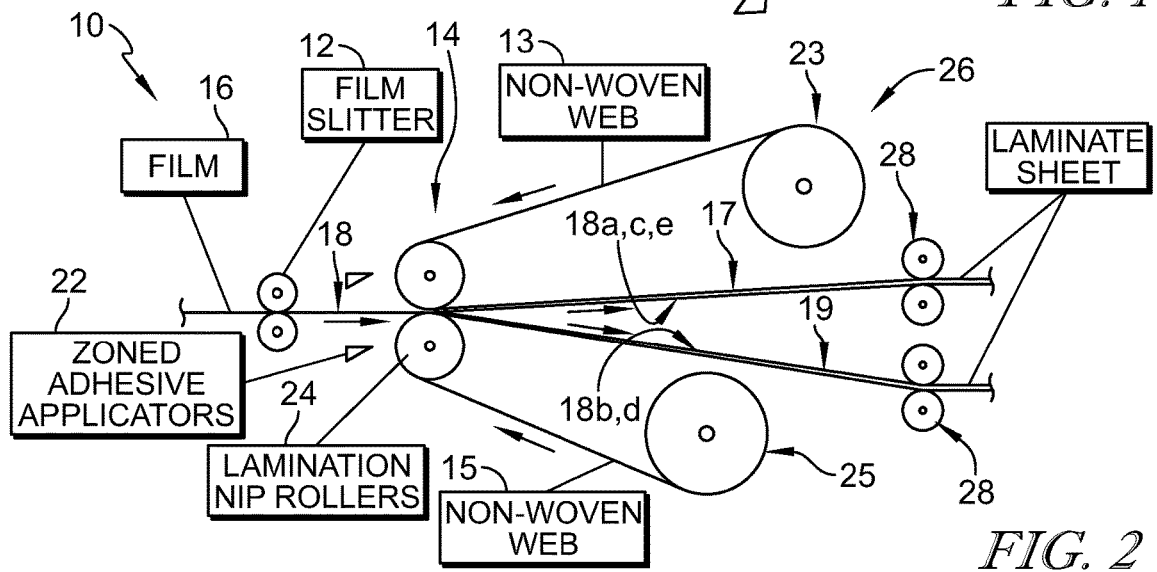

In the illustrative embodiment, laminator 14 includes adhesive applicators 22 and lamination nip rollers 24 as shown in FIGS. 1 and 2. A non-woven material supply 26 includes supply rolls 23, 25 for feeding non-woven webs 13, 15 into lamination nip rollers 24 as suggested in FIG. 2. Non-woven webs or fabrics may be formed from many processes, such as, for example, meltblowing processes, spunbonding processes, hydroentangling processes, and bonded carded web processes. Film strips 18 pass through lamination nip rollers 24 such that non-woven web 13 extends along an upper side of film strips 18 and non-woven web 15 extends along a lower side of film strips 18.

Adhesive applicators 22 are arranged to apply an adhesive material along portions of non-woven webs 13, 15 where film strips 18 are to be bonded as suggested in FIG. 1. In the illustrative embodiment, adhesive applicators 22 apply adhesive onto lower non-woven web 15 along two spaced apart lanes such that two film strips 18b, 18d bond with lower non-woven web 15. Similarly, adhesive applicators 22 apply adhesive onto upper non-woven web 13 along three spaced apart lanes such that the remaining three film strips 18a, 18c, 18e bond with upper non-woven web 13.

Lamination nip rollers 24 apply pressure to film strips 18 and non-woven webs 13, 15 to bond film strips 18 with the respective non-woven webs 13, 15 and form laminate sheets 17, 19 as suggested in FIGS. 1 and 2. In some embodiments, lamination nip rollers 24 are heated or cooled. Divider rollers 28 separate laminate sheets 17, 19 as suggested in FIG. 2. Adjacent film strips 18a, 18b, 18c, 18d, 18e diverge and are carried on non-woven webs 13, 15 as laminate sheets 17, 19 separate from one another as suggested in FIG. 1. Film strips 18a, 18c, 18e form part of laminate sheet 17 while film strips 18b, 18d form part of laminate sheet 19. The distance between film slitter 12 and laminator 14 is minimized to minimize the distance traveled by film strips 18, which may be susceptible to tearing, before being bonded with non-woven webs 13, 15. Likewise, film strips 18 move in the machine direction of in-line lamination system 10 and do not experience lateral changes in direction to minimize stress on film strips 18 before lamination with non-woven webs 13, 15.

Figure 3:
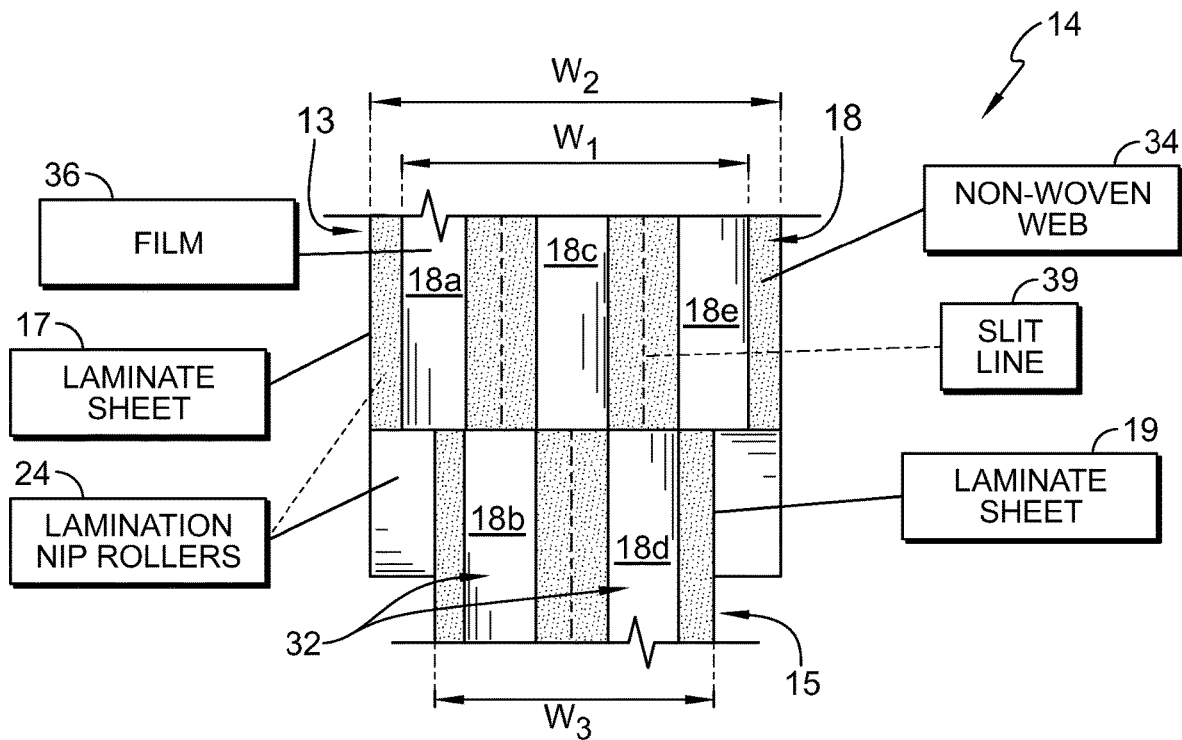

Film strips 18 bonded to each laminate sheet 17, 19 are spaced apart from one another as suggested in FIG. 3. In a post-processing step, non-woven material 34 positioned between adjacent film strips 18 of laminate sheets 17, 19 is cut along slit lines 39 (shown in phantom) to separate laminate sheets 17, 19 into multiple strips of laminate material 32. Each strip of laminate material 32 includes sections of non-woven material 34 positioned along opposing edges of a section of film 36. A width of non-woven material sections 34 compared to a width of film section 36 can be varied at the selection of an operator of in-line lamination system 10. In some embodiments, non-woven material sections 34 are each half as wide as film section 36. In some embodiments, non-woven material sections 34 are each less than half as wide as film section 36. In some embodiments, portions of non-woven material sections 34 are trimmed away such that non-woven material sections 34 are each less than half as wide as film section 36.

Figure 4:
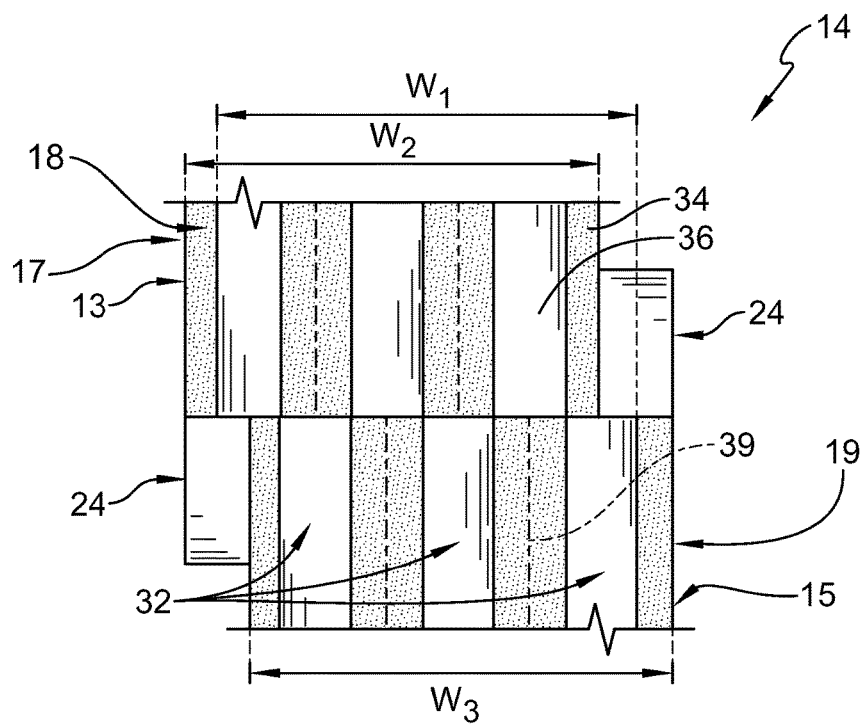

In one illustrative embodiment, a width $W_2$ of upper non-woven web 13 is larger than a combined width $W_1$ of the incoming film strips 18, and width $W_1$ is larger than a width $W_3$ of lower non-woven web 15 where an odd number of film strips 18 are used to form laminate sheets 17, 19 as suggested in FIG. 3. Center lines of non-woven webs 13, 15 and film 16 are aligned during lamination through laminator 14 as shown in FIG. 3. In another illustrative embodiment, widths $W_1$, $W_2$, $W_3$ are equal to one another when an even number of film strips 18 are used to form laminate sheets 17, 19 as suggested in FIG. 4. Center lines of non-woven webs 13, 15 and film 16 are misaligned during lamination through laminator 14 as shown in FIG. 4. The relative sizes of film 16 and non-woven webs 13, 15 are adjustable at the selection of an operator of in-line lamination system 10.

Figure 5:
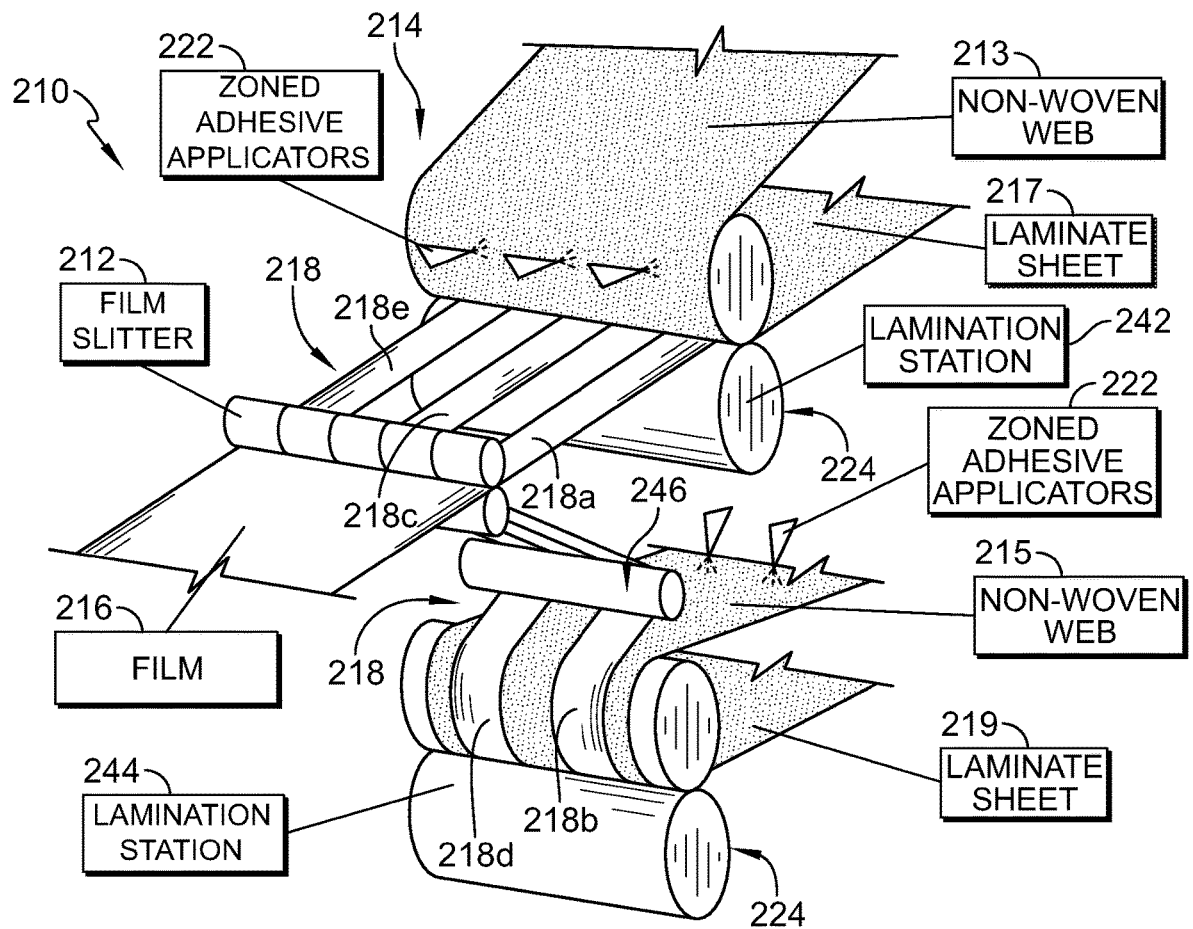
Figure 6:
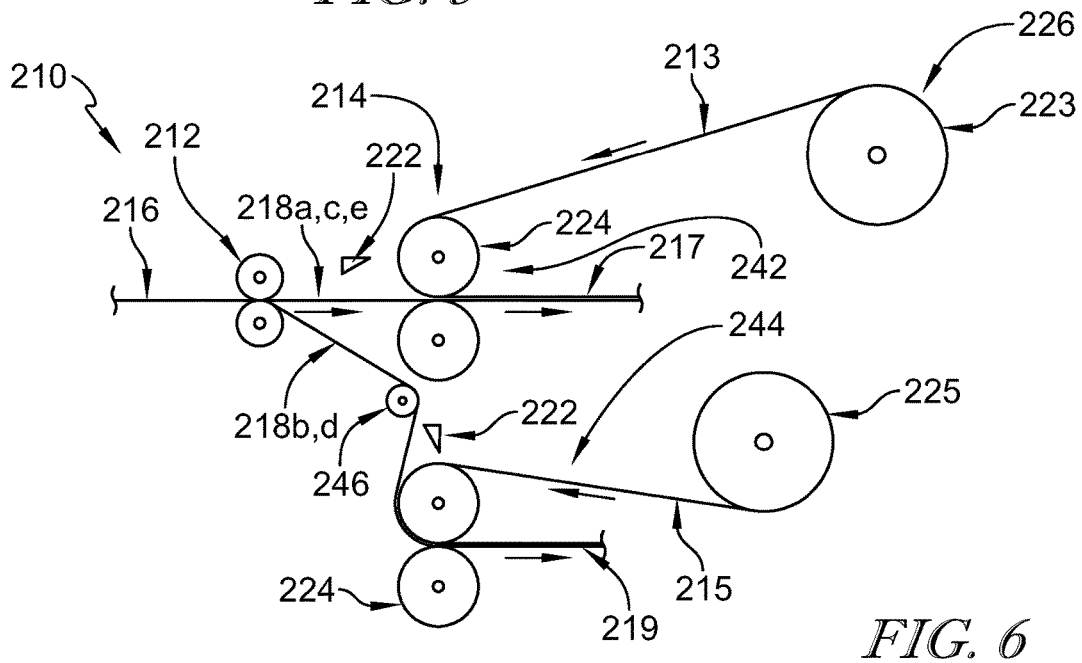
FIG. 6 is a side elevation view of the in-line lamination system of FIG. 5.

Another embodiment of an in-line lamination system 210 in accordance with the present disclosure is shown in FIGS. 5 and 6. In-line lamination system 210 is similar to in-line lamination system 10 and includes a film slitter 212 and a laminator 214. A film 216, such as a breathable or elastic plastic film, passes through slitter 212 to divide film 216 into strips 218. Strips 218 pass through laminator 214 to bond with non-woven webs 213, 215 to form separate laminate sheets 217, 219 having alternating sections of exposed non-woven material and film laminated to and covering a portion of the underlying non-woven material.

In the illustrative embodiment, laminator 214 includes two lamination stations 242, 244 as shown in FIGS. 5 and 6. Each lamination station 242, 244 include adhesive applicators 222 and lamination nip rollers 224. A non-woven material supply 226 includes supply rolls 223, 225 for feeding non-woven webs 213, 215 into lamination stations 242, 244, respectively. Adjacent film strips 218 are directed to one of lamination stations 242, 244 in an alternating pattern such that film strips 218a, 218c, 218e pass through lamination station 242 to bond with non-woven web 213 while the remaining film strips 218b, 218d pass through lamination station 242 to bond with non-woven web 215 as suggested in FIG. 5. An idler 246 guide's film strips 218 toward lamination station 244.

Adhesive applicators 222 are arranged to apply an adhesive material along portions of non-woven webs 213, 215 where film strips 218 are to be bonded as suggested in FIG. 5. In the illustrative embodiment, film strips 218a, 218c, 218e passing through lamination station 242 are laterally spaced apart from one another and adhesive applicators 222 apply adhesive onto upper non-woven web 213 along spaced apart lanes where film strips 218a, 218c, 218e are to be bonded with upper non-woven web 213. Similarly, film strips 218b, 218d passing through lamination station 244 are laterally spaced apart from one another and adhesive applicators 222 apply adhesive onto lower non-woven web 215 along spaced apart lanes where film strips 218b, 218d are to be bonded with lower non-woven web 215.

Lamination nip rollers 224 apply pressure to film strips 218 and non-woven webs 213, 215 to bond film strips 218 with the respective non-woven webs 213, 215 and form laminate sheets 217, 219 as suggested in FIGS. 5 and 6. In some embodiments, lamination nip rollers 224 are heated or cooled. The distance between film slitter 212 and laminator 214 is minimized to minimize the distance traveled by film strips 218, which may be susceptible to tearing, before being bonded with non-woven webs 213, 215. Likewise, film strips 218 move in the machine direction of in-line lamination system 210 and do not experience lateral changes in direction to minimize stress on film strips 218 before lamination with non-woven webs 213, 215. Laminate sheets 217, 219 move through in-line lamination system 210 for roll-up or further processing at the selection of an operator.

Figure 7:
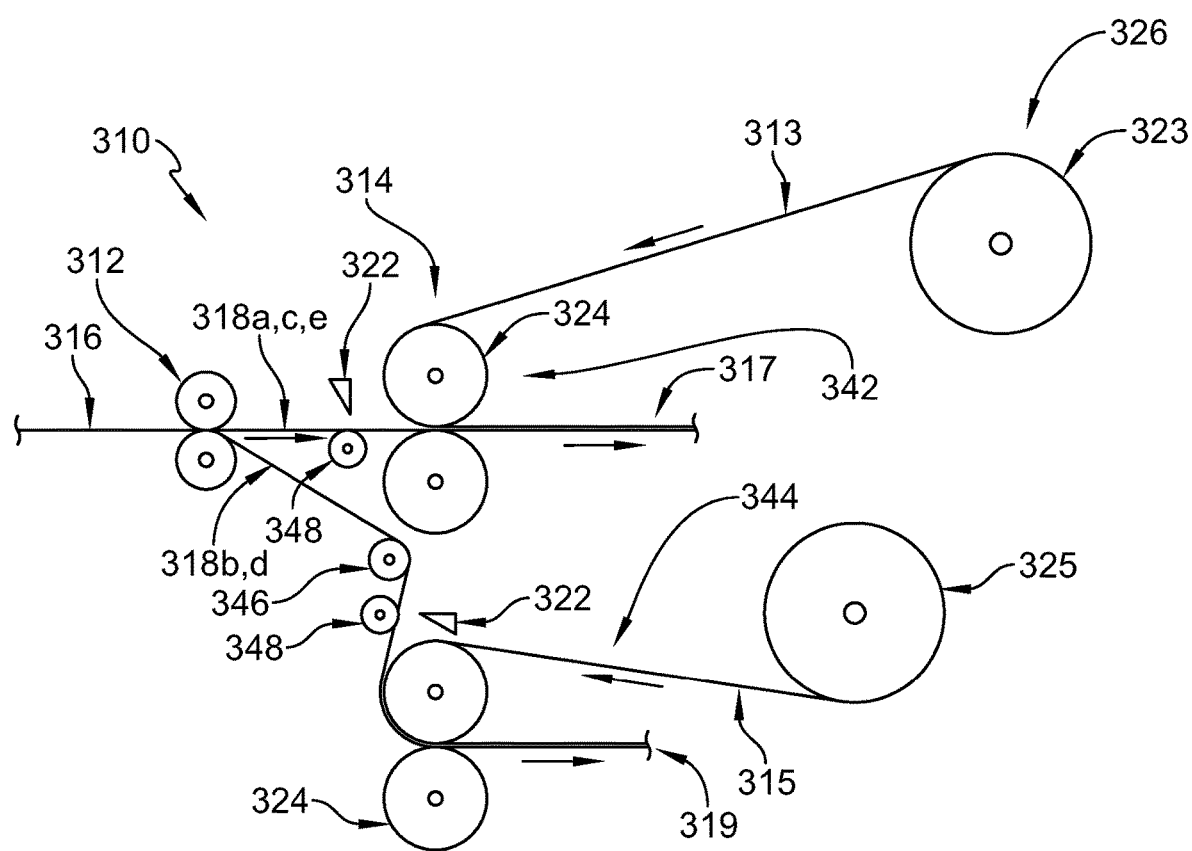
FIG. 7 is a side elevation view of another embodiment of an in-line lamination system in accordance with the present disclosure showing that the in-line lamination system includes adhesive applicators configured to dispense adhesive on strips of film as the strips enter upper and lower pairs of lamination nip rollers to adhere with non-woven webs to form laminate sheets.

Another embodiment of an in-line lamination system 310 in accordance with the present disclosure is shown in FIG. 7. In-line lamination system 310 is similar to in-line lamination system 210 and includes a film slitter 312 and a laminator 314. A film 316, such as a breathable or elastic plastic film, passes through slitter 312 to divide film 316 into strips 318. Strips 318 pass through laminator 314 to bond with non-woven webs 313, 315 to form separate laminate sheets 317, 319 having alternating sections of exposed non-woven material and film laminated to and covering a portion of the underlying non-woven material.

In the illustrative embodiment, laminator 314 includes two lamination stations 342, 344 as shown in FIG. 7. Each lamination station 342, 344 include adhesive applicators 322 and lamination nip rollers 324. A non-woven material supply 326 includes supply rolls 323, 325 for feeding non-woven webs 313, 315 into lamination stations 342, 344, respectively. Adjacent film strips 318 are directed to one of lamination stations 342, 344 in an alternating pattern such that film strips 318a, 318c, 318e pass through lamination station 342 to bond with non-woven web 313 while the remaining film strips 318b, 318d pass through lamination station 342 to bond with non-woven web 315. An idler 346 guide's film strips 318 toward lamination station 344.

Adhesive applicators 322 are arranged to apply an adhesive material onto film strips 318 as suggested in FIG. 7. Backer rolls 348 support film strips 318 as the adhesive material is applied. In the illustrative embodiment, film strips 318a, 318c, 318e passing through lamination station 342 are laterally spaced apart from one another during bonding with upper non-woven web 313. Similarly, film strips 318b, 318d passing through lamination station 344 are laterally spaced apart from one another during bonding with lower non-woven web 315.

Lamination nip rollers 324 apply pressure to film strips 318 and non-woven webs 313, 315 to bond film strips 318 with the respective non-woven webs 313, 315 and form laminate sheets 317, 319 as suggested in FIG. 7. In some embodiments, lamination nip rollers 324 are heated or cooled. The distance between film slitter 312 and laminator 314 is minimized to minimize the distance traveled by film strips 318, which may be susceptible to tearing, before being bonded with non-woven webs 313, 315. Likewise, film strips 318 move in the machine direction of in-line lamination system 310 and do not experience lateral changes in direction to minimize stress on film strips 318 before lamination with non-woven webs 313, 315. Laminate sheets 317, 319 move through in-line lamination system 310 for roll-up or further processing at the selection of an operator.

Figure 8:
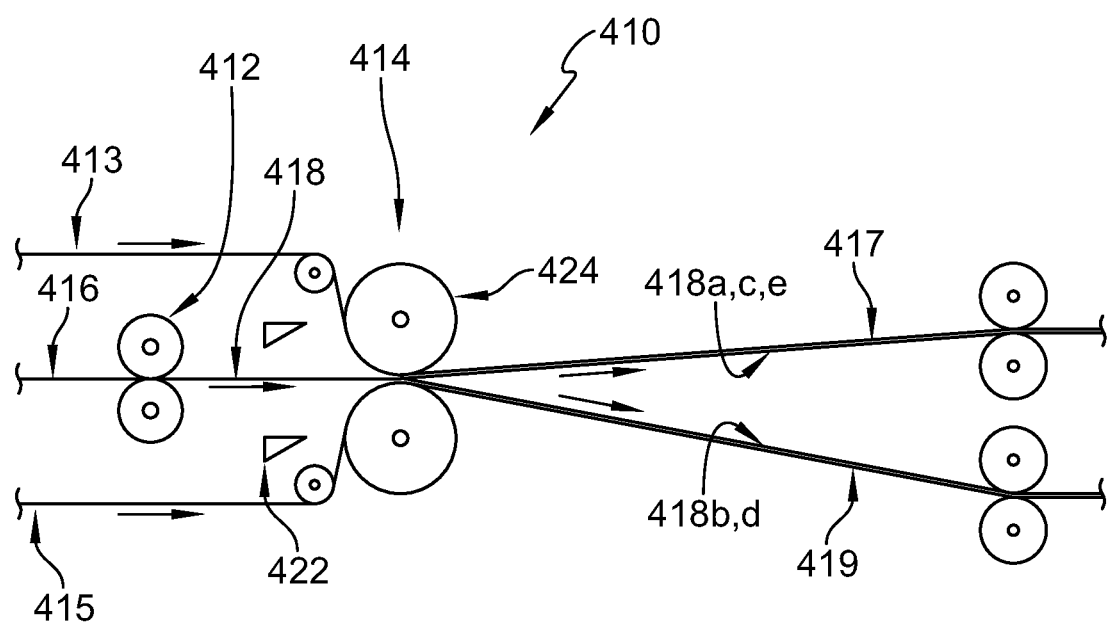
FIG. 8 is a side elevation view of another embodiment of an in-line lamination system in accordance with the present disclosure showing a film, an upper non-woven web, and a lower non-woven web are aligned with one another to move toward lamination nip rollers for laminating.

Another embodiment of an in-line lamination system 410 in accordance with the present disclosure is shown in FIG. 8. In-line lamination system 410 is similar to in-line lamination system 10 and includes a film slitter 412 and a laminator 414. A film 416, such as a breathable or elastic plastic film, passes through slitter 412 to divide film 416 into strips 418. Laminator 414 includes adhesive applicators 422 and lamination nip rollers 424 for bonding film strips 418 with non-woven webs 413, 415. Strips 418 pass through laminator 414 to bond with the respective non-woven webs 413, 415 to form separate laminate sheets 417, 419 having alternating sections of exposed non-woven material and film laminated to and covering a portion of the underlying non-woven material.

Film 416 is continuously supplied to in-line lamination system 410 using an extruder, for example. A non-woven material supply of in-line lamination system 410 is configured to continuously supply non-woven webs 413, 415 for lamination with film 416. Film 416 and non-woven webs 413, 415 move together along a machine direction of in-line lamination system 410 toward laminator 414.

Another embodiment of an in-line lamination system 510 in accordance with the present disclosure is shown in FIG. 9. In-line lamination system 510 is similar to in-line lamination system 10 and includes a film slitter 512 and a laminator 514. A film 516, such as a breathable or elastic plastic film, passes through slitter 512 to divide film 516 into strips 518. Strips 518 pass through laminator 514 to bond with the respective non-woven webs 513, 515 to form separate laminate sheets 517, 519 having alternating sections of exposed non-woven material and film laminated to and covering a portion of the underlying non-woven material.

In the illustrative embodiment, laminator 514 includes alignment nip rollers 524 and an ultrasonic welder 522 as shown in FIG. 10. A non-woven material supply 526 includes supply rolls 523, 525 for feeding non-woven webs 513, 515 into alignment nip rollers 524. Film strips 518 pass through alignment nip rollers 524 such that non-woven web 513 extends along an upper side of film strips 518 and non-woven web 515 extends along a lower side of film strips 518.

In the illustrative embodiment, anti-bond kiss coaters 552, 554 are arranged to apply an anti-bond material, such as a deadener, along portions of non-woven webs 513, 515 where film strips 518 are not to be bonded as suggested in FIG. 9. One embodiment of an anti-bond kiss coater 554 is illustrated in FIG. 10. Anti-bond kiss coater 554 includes a supply of anti-bond material 551, a kiss roller 553, and pass-over skids 555. Kiss roller 553 distributes the anti-bond material received from supply 551 to non-woven web 515 as non-woven web 515 passes anti-bond kiss coaters 554. Pass-over skids 555 block application of the anti-bond material along portions of non-woven web 515 where film strips 518 are to be bonded. In some embodiments, pass-over skids 555 are coated in a non-stick material, such as TEFLON. Anti-bond kiss coater 552 operates similar to anti-bond kiss coater 554 for upper non-woven web 513 as suggested in FIG. 9.

The anti-bond material forms a barrier between film strips 518 and non-woven webs 513, 515 to block bonding of film strips 518 along the coated portions of non-woven webs 513, 515 during ultrasonic welding. The coated portions of non-woven web 513 are offset from the coated portions of non-woven web 515 such that film strips 518a, 518c, 518e are only bonded to non-woven web 513 and the remaining film strips 518b, 518d are only bonded to non-woven web 515. The anti-bond material applied to non-woven webs 513, 515 blocks film strips 518 from bonding to both non-woven webs 513, 515 so that separate laminate sheets 517, 519 can be formed.

In the illustrative embodiment, film strips 518 and non-woven webs 513, 515 all pass together through ultrasonic welder 522 for bonding as suggested in FIG. 9. A support roll 556 supports film strips 518 and non-woven webs 513, 515 during bonding. In some embodiments, support roll 556 is machined or etched with depressions to define areas of localized bonding between film strips 518 and non-woven webs 513, 515 as each passes through ultrasonic welder 522. In some embodiments, material is added to film strips 518 or non-woven webs 513, 515 in a pattern to define areas of localized bonding between film strips 518 and non-woven webs 513, 515 as each passes through ultrasonic welder 522.

Alignment nip rollers 524 collect film strips 518 and non-woven webs 513, 515 and direct each toward ultrasonic welder 522 as suggested in FIG. 9. The distance between film slitter 512 and laminator 514 is minimized to minimize the distance traveled by film strips 518, which may be susceptible to tearing, before being bonded with non-woven webs 513, 515. Likewise, film strips 518 move in the machine direction of in-line lamination system 510 and do not experience lateral changes in direction to minimize stress on film strips 518 before lamination with non-woven webs 513, 515. Laminate sheets 517, 519 move through in-line lamination system 510 for roll-up or further processing at the selection of an operator.

Another embodiment of an in-line lamination system 610 in accordance with the present disclosure is shown in FIG. 11. In-line lamination system 610 is similar to in-line lamination system 510 and includes a film slitter 612 and a laminator 614. A film 616, such as a breathable or elastic plastic film, passes through slitter 612 to divide film 616 into strips 618. Strips 618 pass through laminator 614 to bond with the respective non-woven webs 613, 615 to form separate laminate sheets 617, 619 having alternating sections of exposed non-woven material and film laminated to and covering a portion of the underlying non-woven material.

In the illustrative embodiment, laminator 614 includes two lamination stations 642, 644 as shown in FIG. 11. Each lamination station 642, 644 include alignment nip rollers 624 and an ultrasonic welder 622. A non-woven material supply 626 includes supply rolls 623, 625 for feeding non-woven webs 613, 615 into alignment nip rollers 624. Adjacent film strips 618 are directed to one of lamination stations 642, 644 in an alternating pattern such that film strips 618a, 618c, 618e pass through lamination station 642 to bond with non-woven web 613 while the remaining film strips 618b, 618d pass through lamination station 642 to bond with non-woven web 615. An idler 646 guide's film strips 618 toward lamination station 644.

In the illustrative embodiment, film strips 618a, 618c, 618e passing through lamination station 642 are laterally spaced apart from one another and pass through ultrasonic welder 622 for bonding with upper non-woven web 613. In some embodiments, ultrasonic welder 622 is zoned to apply energy along the portions where film strips 618 and non-woven web 613 overlap. Likewise, film strips 618b, 618d passing through lamination station 644 are laterally spaced apart from one another and pass through ultrasonic welder 622 for bonding with lower non-woven web 615. In some embodiments, ultrasonic welder 622 is zoned to apply energy along the portions where film strips 618 and non-woven web 615 overlap.

Support rolls 656 supports film strips 618 and non-woven webs 613, 615 during bonding. In some embodiments, support roll 656 are machined or etched with depressions to define areas of localized bonding between film strips 618 and non-woven webs 613, 615 as each passes through ultrasonic welders 622. In some embodiments, material is added to film strips 618 or non-woven webs 613, 615 in a pattern to define areas of localized bonding between film strips 618 and non-woven webs 613, 615 as each passes through ultrasonic welders 622.

Alignment nip rollers 624 collect film strips 618 and non-woven webs 613, 615 and directs each toward ultrasonic welders 622 as suggested in FIG. 11. The distance between film slitter 612 and laminator 614 is minimized to minimize the distance traveled by film strips 618, which may be susceptible to tearing, before being bonded with non-woven webs 613, 615. Likewise, film strips 618 move in the machine direction of in-line lamination system 610 and do not experience lateral changes in direction to minimize stress on film strips 618 before lamination with non-woven webs 613, 615. Laminate sheets 617, 619 move through in-line lamination system 610 for roll-up or further processing at the selection of an operator.

In one illustrative embodiment, in-line lamination system 10 includes a film extruder 62 for continuously forming film 16, slitter 12, and laminator 14 as suggested in FIG. 12. Film 16 can be sent through optional pre-processing steps before passing through slitter 12 and laminator 14. An optional breathable film activation station 64 is arranged to impart breathability to film 16 through perforation or ring-roll activation for example. An optional elastic film activation station 68 is arranged to impart additional elasticity to film 16. An optional printer 66 is arranged to print graphics or other patterns on one or both sides of film 16.

In one illustrative embodiment, laminate sheets 17, 19 formed by in-line lamination system 10 proceed to a roll-up station 72 where laminate sheets 17, 19 are collected for transportation as suggested in FIG. 13. An optional post-processing step is to slit laminate sheets 17, 19 into multiple strips of laminate material in a slitting station 74 before roll-up.

In another illustrative embodiment, laminate sheets 17, 19 are formed into a laminate product 90 (sometimes called a tri-laminate) as suggested in FIGS. 14 and 15. Film sections 36 of upper and lower laminate sheets 17, 19 are aligned with one another in an alignment station 92 and laminate sheets 17, 19 are laminated together in a lamination station 94 along non-woven sections 34 forming multiple strips of laminate product 90. In some embodiments, alignment station 92 includes a sheet rotator for rotating a laminate sheet so that film sections face each other, such as, for example, one of laminate sheets 217, 219 that both have film sections facing downward and not toward one another as suggested in FIGS. 5 and 6. Laminate sheets 17, 19 can optionally pass through a ring-roll activation station 91 separately or through a ring-roll activation station 95 after being laminated together to add elasticity to the non-woven material attached to film sections 36. Adjacent strips of laminate product 90 are optionally separated from one another in a slitting station 96 before roll-up for transportation in a roll-up station 98.

Laminate product 90 includes overlapping sections of film 36 surrounded by non-woven material as suggested in FIG. 15. In the illustrative embodiment, film sections 36 form a moisture barrier and the surrounding non-woven material 35 provides a soft exterior finish to laminate product 90. Laminate product 90 is useful in hygiene applications, such as diapers and other incontinence products, and healthcare applications, such as medical gowns and drapes, for example.

Another embodiment of an in-line lamination system 710 in accordance with the present disclosure is shown in FIG. 16. In-line lamination system 710 is similar to in-line lamination system 510 and includes a film slitter 712 and a laminator 714. A film 716, such as a breathable or elastic plastic film, passes through slitter 712 to divide film 716 into strips 718. Strips 718 pass through laminator 714 to bond with the respective non-woven webs 713, 715 to form separate laminate sheets 717, 719 having alternating sections of exposed non-woven material and film laminated to and covering a portion of the underlying non-woven material.

In the illustrative embodiment, laminator 714 includes adhesive applicators 722 and lamination nip rollers 724 as shown in FIG. 16. A non-woven material supply 726 includes supply rolls 723, 725 for feeding non-woven webs 713, 715 into lamination nip rollers 724. Film strips 518 pass through lamination nip rollers 724 such that non-woven web 713 extends along an upper side of film strips 718 and non-woven web 715 extends along a lower side of film strips 718.

Adhesive applicators 722 are arranged to apply an adhesive material along both sides of film strips 718 as suggested in FIG. 16. In the illustrative embodiment, anti-bond kiss coaters 752, 754 are arranged to apply an anti-bond material, such as a deadener, along portions of non-woven webs 713, 715 where film strips 718 are not to be bonded. The anti-bond material forms a barrier between film strips 718 and non-woven webs 713, 715 to block bonding of film strips 718 along the coated portions of non-woven webs 713, 715.

Lamination nip rollers 724 apply pressure to film strips 718 and non-woven webs 713, 715 to bond film strips 718 with the respective non-woven webs 713, 715 and form laminate sheets 717, 719 as suggested in FIG. 16. In some embodiments, lamination nip rollers 724 are heated or cooled. The anti-bond coated portions of non-woven web 713 are offset from the anti-bond coated portions of non-woven web 715 such that film strips 718*a*, 718*c*, 718*e* are only bonded to non-woven web 713 and the remaining film strips 718*b*, 718*d* are only bonded to non-woven web 715. The anti-bond material applied to non-woven webs 713, 715 blocks film strips 718 from bonding to both non-woven webs 713, 715 so that separate laminate sheets 717, 719 can be formed.

Divider rollers 728 separate laminate sheets 717, 719 as suggested in FIG. 16. Adjacent film strips 718*a*, 718*b*, 718*c*, 718*d*, 718*e* diverge and are carried on non-woven webs 713, 715 as laminate sheets 717, 719 separate from one another. Film strips 718*a*, 718*c*, 718*e* form part of laminate sheet 717 while film strips 718*b*, 718*d* form part of laminate sheet 719. The distance between film slitter 712 and laminator 714 is minimized to minimize the distance traveled by film strips 718, which may be susceptible to tearing, before being bonded with non-woven webs 713, 715. Likewise, film strips 718 move in the machine direction of in-line lamination system 710 and do not experience lateral changes in direction to minimize stress on film strips 718 before lamination with non-woven webs 713, 715. Laminate sheets 717, 719 move through in-line lamination system 710 for roll-up or further processing at the selection of an operator. In some embodiments, during later processing, such as during formation of a laminate product 90 as described above, the adhesive applied to film strips 718 allows bonding of facing film strips 718 as portions of laminate sheets 717, 719 are bonded together, such as by ultrasonic welding.

Another embodiment of an in-line lamination system 810 in accordance with the present disclosure is shown in FIG. 17. In-line lamination system 810 is similar to in-line lamination system 710 and includes a film slitter 812 and a laminator 814. A film 816, such as a breathable or elastic plastic film, passes through slitter 812 to divide film 816 into strips 818. Strips 818 pass through laminator 814 to bond with the respective non-woven webs 813, 815 to form separate laminate sheets 817, 819 having alternating sections of exposed non-woven material and film laminated to and covering a portion of the underlying non-woven material.

In the illustrative embodiment, laminator 814 includes adhesive applicators 822 and lamination nip rollers 824 as shown in FIG. 17. A non-woven material supply 826 includes supply rolls 823, 825 for feeding non-woven webs 813, 815 into lamination nip rollers 824. Film strips 818 pass through lamination nip rollers 824 such that non-woven web 813 extends along an upper side of film strips 818 and non-woven web 815 extends along a lower side of film strips 818.

Adhesive applicators 822 are arranged to apply an adhesive material along a width of non-woven webs 813, 815 as suggested in FIG. 17. In the illustrative embodiment, zoned anti-bond print heads 852 are arranged to apply an anti-bond material, such as a deadener, along portions of film 816 such that one side of each film strip 818 is coated where film strips 818 are not to be bonded with non-woven webs 813, 815. In some embodiments, print heads 852 are arranged after slitter 812 to apply the anti-bond material onto film strips 818. In some embodiments, print heads 852 are ink jet print heads, and the anti-bond material is in the form of an ink solution capable of passing through the ink jet print heads. The anti-bond material forms a barrier between film strips 818 and non-woven webs 813, 815 to block bonding of film strips 818 along the coated portions.

Lamination nip rollers 824 apply pressure to film strips 818 and non-woven webs 813, 815 to bond film strips 818 with the respective non-woven webs 813, 815 and form laminate sheets 817, 819 as suggested in FIG. 17. Film strips 818 block bonding together of non-woven webs 813, 815 as film strips 818 and non-woven webs 813, 815 pass through lamination nip rollers 824. In some embodiments, lamination nip rollers 824 are heated or cooled. The anti-bond coated portions of adjacent film strips 818 are offset such that film strips 818*a*, 818*c*, 818*e* are only bonded to non-woven web 813 and the remaining film strips 818*b*, 818*d* are only bonded to non-woven web 815. The anti-bond material applied to film strips 818 blocks film strips 818 from bonding to both non-woven webs 813, 815 so that separate laminate sheets 817, 819 can be formed.

Divider rollers 828 separate laminate sheets 817, 819 as suggested in FIG. 17. Adjacent film strips 818*a*, 818*b*, 818*c*, 818*d*, 818*e* diverge and are carried on non-woven webs 813, 815 as laminate sheets 817, 819 separate from one another. Film strips 818*a*, 818*c*, 818*e* form part of laminate sheet 817 while film strips 818*b*, 818*d* form part of laminate sheet 819. The distance between film slitter 812 and laminator 814 is minimized to minimize the distance traveled by film strips 818, which may be susceptible to tearing, before being bonded with non-woven webs 813, 815. Likewise, film strips 818 move in the machine direction of in-line lamination system 810 and do not experience lateral changes in direction to minimize stress on film strips 818 before lamination with non-woven webs 813, 815. Laminate sheets 817, 819 move through in-line lamination system 810 for roll-up or further processing at the selection of an operator. In some embodiments, during later processing, such as during formation of a laminate product 90 as described above, the adhesive applied to non-woven webs 813, 815 allows bonding of portions of laminate sheets 817, 819, such as by passing through a set of lamination nip rollers, while facing film strips 818 are left un-bonded.

In illustrative embodiments, an extruded film is slit prior to lamination with a non-woven web and waste is minimized by sending alternating strips of film to an upper lamination station and a lower lamination station where either full width continuous non-woven webs are fed in, or multiple webs of non-woven are fed in, to minimize trimming of the non-woven webs during processing. Sending alternating lanes to two lamination stations allows for the gaps between strips during lamination while retaining the full area of the extruded film as good product. The system produces laminate sheets in-line, simultaneously and produces them without complex handling of narrow film strips.

In illustrative embodiments, the laminate sheets are produced using adhesive or ultrasonic bonding where the film is extruded, quenched, oriented, optionally printed, and then laminated to a non-woven web. The laminate sheets are then wound into rolls. The laminate sheets are separated into strips of laminate material where the film strip is about 50 percent of the width of the non-woven web. A full width of the system is used to produce the laminate sheets maximizing output.

The invention claimed is:

1. An in-line lamination system comprising
a film slitter aligned along a machine direction and adapted to receive a sheet of film along the machine direction and form film strips from the sheet of film, the film strips aligned along the machine direction in a series of adjacent lanes,
a material supply adapted to provide a first substantially continuous web and a second substantially continuous web along the machine direction, and
a laminator aligned with the film slitter along the machine direction and configured to receive the film strips, the first web, and the second web and bond selectively the film strips in adjacent lanes alternatingly to one of the first web or the second web to form a first laminate sheet and a second laminate sheet, each of the first laminate sheet and the second laminate sheet having alternating sections of exposed material and film material.

2. The in-line lamination system of claim 1, wherein the laminator includes adhesive applicators and a pair of lamination nip rollers.

3. The in-line lamination system of claim 2, wherein the adhesive applicators are configured to apply an adhesive material to the first web and the second web and the lamination nip rollers are configured to force the film strips against the first web and the second web.

4. The in-line lamination system of claim 3, further comprising print heads configured to apply an anti-bond material to the film strips.

5. The in-line lamination system of claim 2, wherein the adhesive applicators are configured to apply an adhesive material to the film strips and the lamination nip rollers are configured to force the film strips against the first web and the second web.

6. The in-line lamination system of claim 5, further comprising anti-bond kiss coaters configured to apply an anti-bond material to the first web and the second web in zones.

7. The in-line lamination system of claim 1, wherein the laminator includes a pair of alignment nip rollers and an ultrasonic welder.

8. The in-line lamination system of claim 7, further comprising anti-bond kiss coaters configured to apply an anti-bond material to the first web and the second web in zones.

9. The in-line lamination system of claim 1, wherein the laminator includes a first lamination station and a second lamination station, each lamination station is arranged along the common direction and off-set from one another, the first lamination station is configured to receive a first plurality of the film strips and the first web, the second lamination station is configured to receive a second plurality of the film strips and the second web, and the first plurality of film strips and the second plurality of film strips each include film strips in non-adjacent lanes.

10. The in-line lamination system of claim 1, further comprising a film supply adapted to provide the sheet of film in a continuous form.

11. The in-line lamination system of claim 10, wherein the film supply is an extruder.

12. The in-line lamination system of claim 10, further comprising a breathable film activation station configured to impart breathability to the film.

13. The in-line lamination system of claim 10, further comprising an elastic film activation station configured to impart elasticity to the film.

14. The in-line lamination system of claim 1, further comprising a slitting station configured to separate the first laminate sheet and the second laminate sheet into strips of laminate material.

15. The in-line lamination system of claim 1, further comprising an alignment station configured to align film strips of the first laminate sheet with film strips of the second laminate sheet in confronting relation to one another.

16. The in-line lamination system of claim 15, further comprising a lamination station configured to bond the first laminate sheet to the second laminate sheet along the sections of exposed material to form a laminate product.

17. The in-line lamination system of claim 16, further comprising a slitting station configured to separate the laminate product into strips of laminate product.

18. An in-line lamination system comprising
a film slitter aligned along a machine direction and adapted to receive a sheet of film along the machine direction and form film strips from the sheet of film, the film strips aligned along the machine direction in a series of adjacent lanes,
a material supply adapted to provide a first substantially continuous web and a second substantially continuous web along the machine direction, and
a laminator aligned with the film slitter along the machine direction and configured to receive the film strips, the first web, and the second web,
wherein the laminator is configured to provide means for selectively bonding the film strips in adjacent lanes alternatingly to one of the first web or the second web to form a first laminate sheet and a separate second laminate sheet, each of the first laminate sheet and the second laminate sheet having alternating sections of exposed material and film material.

19. The in-line lamination system of claim 18, wherein the laminator includes a first lamination station and a second lamination station, each lamination station is arranged along the common direction and off-set from one another, the first lamination station is configured to receive a first plurality of the film strips and the first web, the second lamination station is configured to receive a second plurality of the film strips and the second web, and the first plurality of film strips and the second plurality of film strips each include film strips in non-adjacent lanes.

20. The in-line lamination system of claim 18, further comprising at least one of a breathable film formation station configured to form the sheet of film into a breathable film and an elastic film formation station configured to form the sheet of film into an elastic film.

* * * * *